(12) United States Patent
A Hummaida et al.

(10) Patent No.: US 8,984,058 B2
(45) Date of Patent: Mar. 17, 2015

(54) PRE-FETCHING REMOTE RESOURCES

(71) Applicant: AppSense Limited, Warrington (GB)

(72) Inventors: Abdul Rahman Salah Eldin A Hummaida, Manchester (GB); Fahd Rafi, Warrington (GB)

(73) Assignee: AppSense Limited (GB)

(*) Notice: Subject to any disclaimer, the term of this patent is extended or adjusted under 35 U.S.C. 154(b) by 242 days.

(21) Appl. No.: 13/838,709

(22) Filed: Mar. 15, 2013

(65) Prior Publication Data

US 2014/0280485 A1    Sep. 18, 2014

(51) Int. Cl.
*H04L 29/08* (2006.01)

(52) U.S. Cl.
CPC .................................. *H04L 67/1097* (2013.01)
USPC ............... 709/203; 709/229; 709/226; 726/1; 726/4; 726/25; 726/22; 726/9

(58) Field of Classification Search
USPC ......................................... 709/203, 229, 226
See application file for complete search history.

(56) References Cited

U.S. PATENT DOCUMENTS

| | | | |
|---|---|---|---|
| 6,633,968 B2 | 10/2003 | Zwiegincew et al. | |
| 8,452,451 B1* | 5/2013 | Francis et al. | 700/258 |
| 8,904,506 B1* | 12/2014 | Canavor et al. | 726/7 |
| 2008/0281606 A1* | 11/2008 | Kitts et al. | 705/1 |

OTHER PUBLICATIONS

Yan, Tingxin, et al., "Fast App Launching for Mobile Devices Using Predictive User Context", MobiSys'12, Jun. 25-29, 2012, United Kingdom, 14 pages.

* cited by examiner

*Primary Examiner* — Jude Jean Gilles
(74) *Attorney, Agent, or Firm* — Wilmer Cutler Pickerng Hales and Dorr LLP

(57) ABSTRACT

Systems and methods are described for pre-fetching remote resources. A computerized method of pre-fetching remote resources includes calculating a probability of a request for a remote resource by a user within a validity period, based on a representation of historical requests for the remote resource by the user, pre-fetching the remote resource if the probability is greater than a threshold, intercepting an actual request for the remote resource by the user, recording the actual request into the representation of the historical requests by the user, and fulfilling the actual request for the remote resource using the pre-fetched remote resource.

21 Claims, 8 Drawing Sheets

PRE-FETCHING REMOTE RESOURCES

BACKGROUND

Many computer programs (e.g., applications) use both local and remote components/resources to execute during run-time. The remote components/resources are traditionally downloaded from a remote source (e.g., a remote server) on demand when they are needed (e.g., when an application using these remote resources is launched, when a feature requiring these remote resources is activated, etc.). This mechanism can cause delays in launching the application or executing certain functions, thus impacting system performances and end-user experiences. This problem becomes increasingly prominent in today's online world, especially for mobile applications running on high latency and low bandwidth networks or applications based on thin-client models that access most data and resources over a network.

SUMMARY

In accordance with the disclosed subject matter, systems and methods are described for pre-fetching remote resources.

Disclosed subject matter includes, in one aspect, a computerized method of pre-fetching remote resources, which includes calculating a probability of a request for a remote resource by a user within a validity period, based on a representation of historical requests for the remote resource by the user, pre-fetching the remote resource if the probability is greater than a threshold, intercepting an actual request for the remote resource by the user, recording the actual request into the representation of the historical requests by the user, and fulfilling the actual request for the remote resource using the pre-fetched remote resource.

In some embodiments, the computerized method of pre-fetching remote resources further includes rendering the pre-fetched remote resource obsolete if the pre-fetched remote resource expires based on the validity period.

In some other embodiments, the computerized method of pre-fetching remote resources further includes receiving the representation of the historical requests by the user from a remote server, wherein the historical requests for the remote resource originate from multiple devices used by the user.

In some other embodiments, the computerized method of pre-fetching remote resources further includes transmitting the representation of the historical requests by the user to the remote server.

In some other embodiments, the computerized method of pre-fetching remote resources further includes receiving a second representation of additional historical requests for the remote resource by other users from a remote server, and calculating the probability of the request for the remote resource by the user within the validity period, based on the second representation of the additional historical requests for the remote resource by the other users.

In some other embodiments, the computerized method of pre-fetching remote resources further includes setting the validity period.

In some other embodiments, the computerized method of pre-fetching remote resources further includes setting the threshold.

Disclosed subject matter includes, in another aspect, a computer system for pre-fetching remote resources, which includes a probability calculator configured to calculate a probability of a request for a remote resource by a user within a validity period, based on a representation of historical requests for the remote resource by the user, a resource pre-fetcher configured to pre-fetch the remote resource if the probability is greater than a threshold, a request interceptor configured to intercept an actual request for the remote resource by the user, a historical request manager configured to record the actual request into the representation of the historical requests by the user, and a request fulfiller configured to fulfill the request for the remote resource using the pre-fetched remote resource.

In some embodiments, the computer system for pre-fetching remote resources further includes a pre-fetched resource manager configured to render the pre-fetched remote resource obsolete if the pre-fetched remote resource expires based on the validity period.

In some other embodiments, the computer system for pre-fetching remote resources further includes a pre-fetch server interface configured to download the representation of the historical requests by the user from a remote server, the historical requests for the remote resource originating from multiple devices used by the user.

In some other embodiments, the pre-fetch server interface is further configured to transmit the representation of the historical requests by the user to the remote server.

In some other embodiments, the pre-fetch server interface is further configured to receive a second representation of additional historical requests for the remote resource by other users from a remote server, and the probability calculator is further configured to calculate the probability of the request for the remote resource by the user within the validity period based on the second representation of the additional historical requests for the remote resource by the other users.

In some other embodiments, the computer system for pre-fetching remote resources further includes a pre-fetch configurator configured to set the validity period.

In some other embodiments, the computer system for pre-fetching remote resources further includes a pre-fetch configurator configured to set the threshold.

Disclosed subject matter includes, in yet another aspect, a non-transitory computer readable medium having executable instructions operable to, when executed by a processor, cause the processor to: calculate a probability of a request for a remote resource by a user within a validity period, based on a representation of historical requests for the remote resource by the user, pre-fetch the remote resource if the probability is greater than a threshold, intercept an actual request for the remote resource by the user, record the actual request into the representation of the historical requests by the user, and fulfill the actual request for the remote resource using pre-fetched remote resource.

In some embodiments, the executable instructions are further operable to, when executed by the processor, cause the processor to render the pre-fetched remote resource obsolete if the pre-fetched remote resource expires based on the validity period.

In some other embodiments, the executable instructions are further operable to, when executed by the processor, cause the processor to receive the representation of the historical requests by the user from a remote server, wherein the historical requests for the remote resource originate from multiple devices used by the user.

In some other embodiments, the executable instructions are further operable to, when executed by the processor, cause the processor to transmit the representation of the historical requests by the user to the remote server.

In some other embodiments, the executable instructions are further operable to, when executed by the processor, cause the processor to receive a second representation of additional historical requests for the remote resource by other users from a remote server, and calculate the probability of the request for the remote resource by the user within the validity period, based on the second representation of the additional historical requests for the remote resource by the other users.

In some other embodiments, the executable instructions are further operable to, when executed by the processor, cause the processor to set the validity period.

In some other embodiments, the executable instructions are further operable to, when executed by the processor, cause the processor to set the threshold.

Various embodiments of the subject matter disclosed herein can provide one or more of the following capabilities. Systems and methods for pre-fetching remote resource data can increase system performance and enhance user experiences. A remote resource that will likely be used in the near future by a user can be pre-fetched from a remote source such that when it is actually needed, it will already reside on the local device, thus eliminating/reducing delay. The probability of near-future use of remote resources by a user can be calculated based on historical requests by the user across multiple devices and sometimes also based on historical requests by other users.

These and other capabilities of embodiments of the disclosed subject matter will be more fully understood after a review of the following figures, detailed description, and claims.

DESCRIPTION

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are only examples, and that it is contemplated that there are other systems and methods that are within the scope of the disclosed subject matter.

Embodiments of the disclosed subject matter can provide features for pre-fetching remote resources, such as in a networked computing environment. Pre-fetching remote resource data can increase system performance and enhance user experiences. A remote resource that will likely be used soon by a user can be pre-fetched from a remote source. The probability of near-future use of a certain remote resource by a particular user can be calculated based on historical requests by this particular user. For example, if 90% of a user's previous logon events occurred 8:30-9:00 am during weekdays, the probability that the user will log on again 8:30-9:00 am in the next working day is high; therefore, the logon-related remote resources (e.g., user profile, wallpapers, user settings, etc.) can be pre-fetched to the local logon device shortly before 8:30 am during weekdays so that when the user does actually log on 8:30-9:00 am the local logon device can respond faster. The historical requests by a particular user can include requests by the user across multiple devices. In addition, the probability for one user can also be calculated based on historical requests by other users. In one example, the other users can include users in the same department or organization, users in the same time zone, or users who use the same application, etc. Other embodiments are within the scope of the disclosed subject matter.

Figure 1:
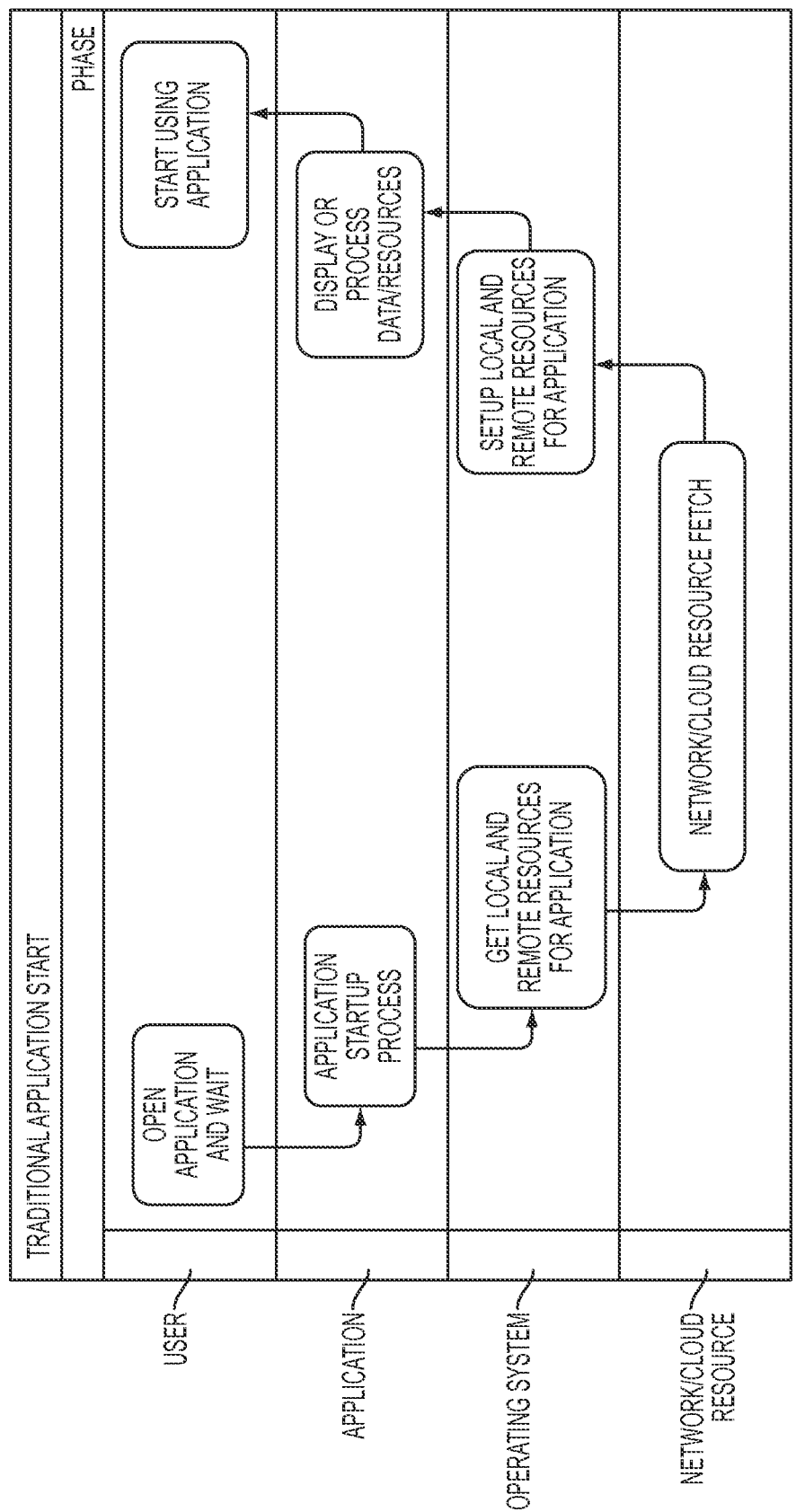
FIG. 1 illustrates an exemplary launch process of a traditional application.

FIG. 1 illustrates an exemplary launch process of a traditional application. Referring to FIG. 1, a user first launches an application on a local device then waits for the application to be ready for use. Once launched, the application can begin its startup process. During the startup process, the application typically asks the operating system (OS) to get the local and remote resources required by the application. The OS can then request and receive the remote resources from a network/cloud server and/or storage. Once the remote resources are available on the local device, the OS can complete setting up the local and remote resources for the application. The application can then continue processing the local and remote resources provided by the OS. After the application completes the startup process, the application is typically ready for use and the user can start using the application. In the exemplary application launch process illustrated in FIG. 1, the remote resources are retrieved from the remote source when they are needed. Thus, the application (and the user) typically needs to wait for the remote retrieval, which can be costly and time-consuming.

Figure 2:
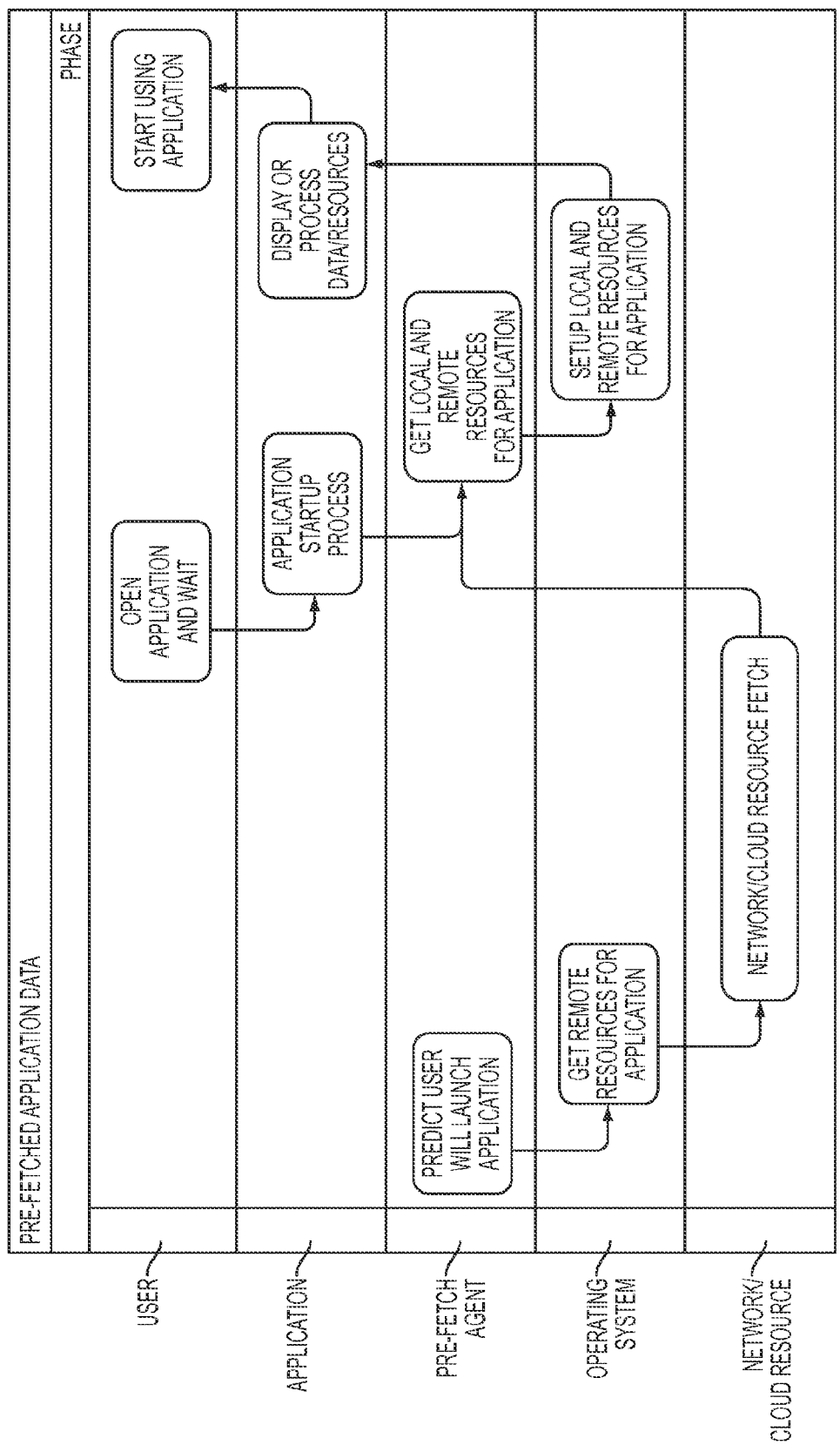
FIG. 2 illustrates an exemplary launch process of an application according to certain embodiments of the subject matter disclosed herein.

In comparison, FIG. 2 illustrates an exemplary launch process of an application utilizing certain features of the disclosure subject matter. Referring to FIG. 2, before a user launches an application on a local device, a pre-fetch agent running on the local device can predict that the user will likely launch an application in the near future. Based on this prediction, the pre-fetch agent can ask the operating system (OS) to get the remote resources used by the application. The OS can then request and retrieve the remote resources from the network/cloud server and/or storage. The pre-fetched resources can then be stored on the local device.

When the user actually launches the application on the local device, the application can begin its startup process. The pre-fetch agent running on the local device can intercept the application launch event. Instead of asking the OS to retrieve the required remote resources from the network/cloud server and/or storage, the pre-fetch agent can fulfill the application's need by using the pre-fetched resources already stored on the local device. The OS can then complete setting up the local and remote resources for the application. The application can then continue processing the local and remote resources. After the application completes the startup process, the application is typically ready for use and the user can start using the application. In the exemplary application launch process illustrated in FIG. 2, the remote resources are pre-fetched from the remote source before they are actually needed. Thus the application (and the user) does not need to wait for the potentially costly and time-consuming remote retrieval, thus enhancing system performance and improving user experiences.

Figure 3:
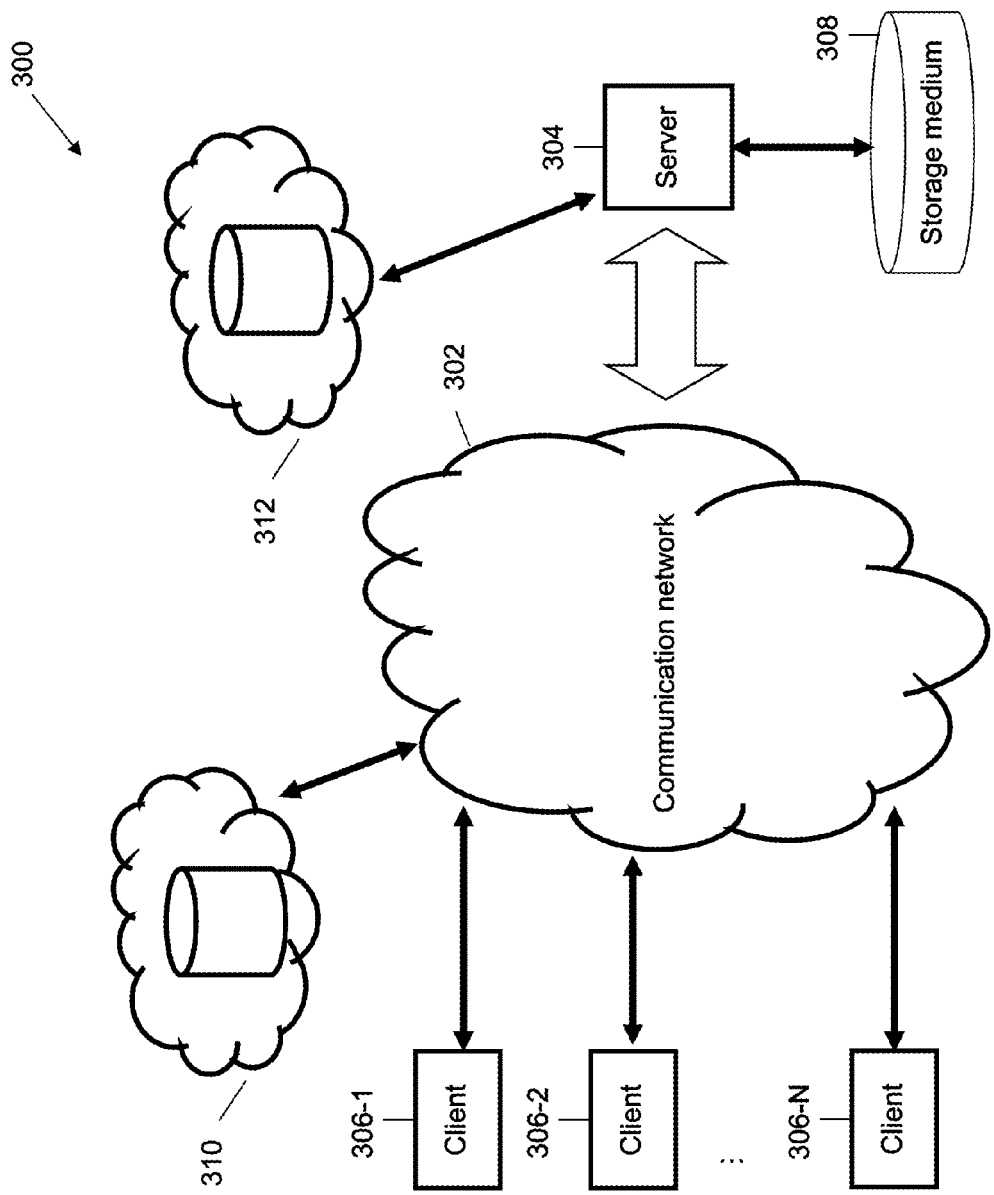
FIG. 3 illustrates an exemplary networked communication environment.

Embodiments of the disclosed subject matter can be implemented in a networked computing environment. FIG. 3 illustrates an exemplary networked communication environment 300 in accordance with certain embodiments of the disclosed subject matter. The networked communication environment 300 can include a server 304, at least one client 306 (e.g., client 306-1, 306-2, . . . 306-N), a physical storage medium 308, and cloud storage 310 and 312, which can all be coupled, directly or indirectly to a communication network 302.

Each client 306 can communicate with the server 304 to send data to, and receive data from, the server 304 across the communication network 302. Each client 306 can be directly coupled to the server 304. Additionally, each client 306 can be connected to server 304 via any other suitable device, communication network, or combination thereof. For example, each client 306 can be coupled to the server 304 via one or more routers, switches, access points, and/or communication network (as described below in connection with communication network 302). A client 306 can include, for example, a desktop computer, a mobile computer, a tablet computer, a cellular device, a smartphone, or any computing systems that are capable of performing computation.

Server 304 can be coupled to at least one physical storage medium 308, which can be configured to store data for the server 304. Preferably, any client 306 can store data in, and access data from, the physical storage medium 308 via the server 304. FIG. 3 shows the server 304 and the physical storage medium 308 as separate components; however, the server 304 and physical storage medium 308 can be combined together. FIG. 3 also shows the server 304 as a single server; however, server 304 can include more than one server. FIG. 3 shows the physical storage medium 308 as a single physical storage medium; however, physical storage medium 308 can include more than one physical storage medium. The physical storage medium 308 can be located in the same physical location as the server 304, at a remote location, or any other suitable location or combination of locations.

FIG. 3 shows two embodiments of a cloud storage 310 and 312. Cloud storage 310 and/or 312 can store data from physical storage medium 308 with the same restrictions, security measures, authentication measures, policies, and other features associated with the physical storage medium 308. While FIG. 3 shows the cloud storage 312 separate from the communication network 302, cloud storage 312 can also be part of communication network 302 or another communication network. The server 304 can use only cloud storage 310, only cloud storage 312, or both cloud storages 310 and 312. While, FIG. 3 shows one cloud storage 310 and one cloud storage 312, more than one cloud storage 310 and/or more than one cloud storage 312 or any suitable combination thereof can be used.

The communication network 302 can include the Internet, a cellular network, a telephone network, a computer network, a packet switching network, a line switching network, a local area network (LAN), a wide area network (WAN), a global area network, or any number of private networks currently referred to as an Intranet, and/or any other network or combination of networks that can accommodate data communication. Such networks may be implemented with any number of hardware and software components, transmission media and network protocols. While FIG. 3 shows the network 302 as a single network, the network 302 can also include multiple interconnected networks listed above.

Figure 4:
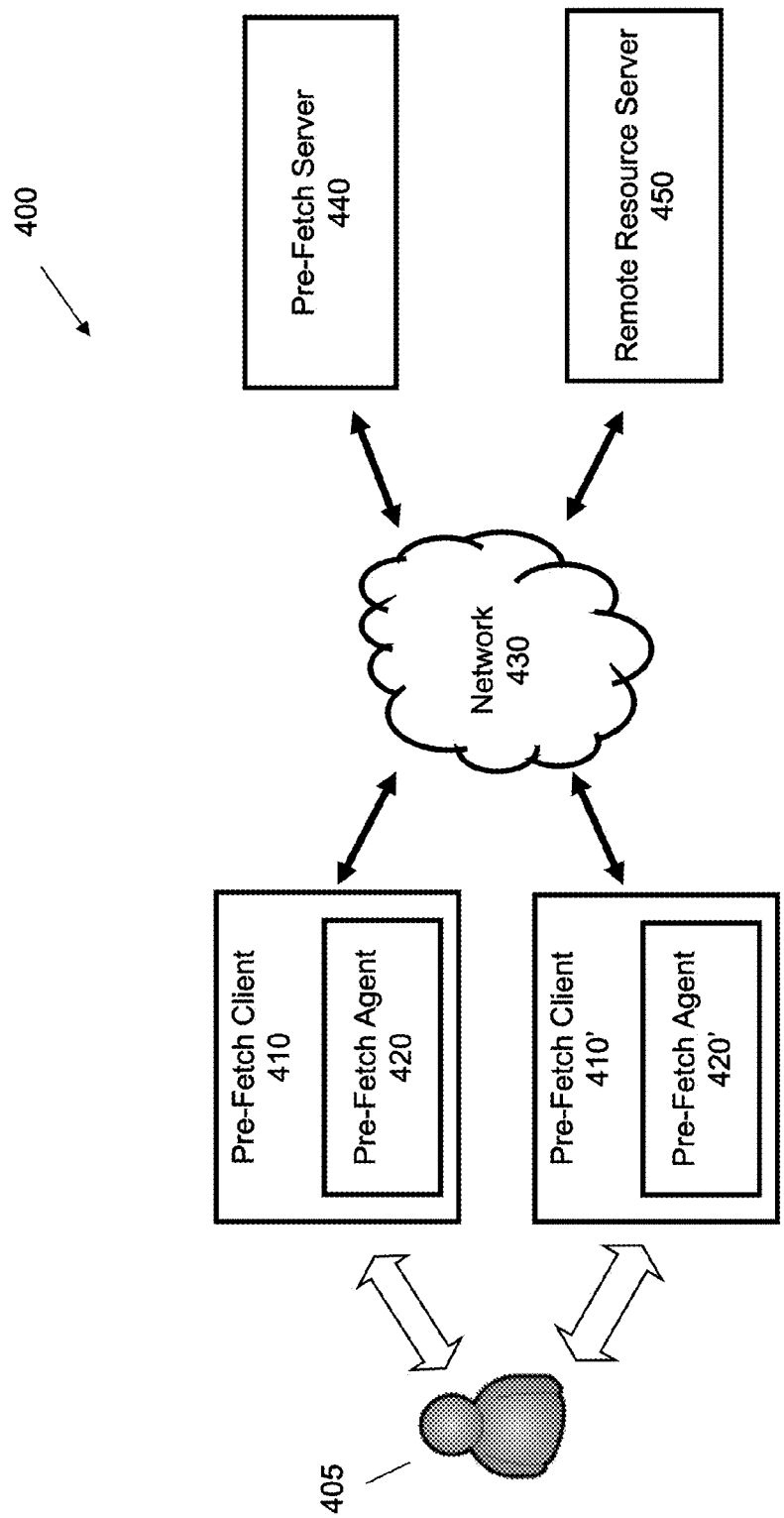
FIG. 4 illustrates an exemplary remote resource pre-fetching arrangement.

FIG. 4 illustrates an exemplary remote resource pre-fetching arrangement 400 according to certain embodiments of the disclosed subject matter. The remote resource pre-fetching arrangement can include a user 405, one or more pre-fetch clients 410/410', a network 430, a pre-fetch server 440, and a remote resource server 450. Each pre-fetch client 410/410' can include a pre-fetch agent 420/420'. The pre-fetch clients 410/410', the pre-fetch server 440, the remote resource server 450 can be directly or indirectly coupled to the network 430 and communicate among each other via the network 430, which can be wired, wireless, or a combination of both.

The pre-fetch client 410/410', like each client 306 illustrated in FIG. 3, can include a desktop computer, a mobile computer, a tablet computer, a cellular device, a smartphone, or any computing systems that are capable of performing computation. The pre-fetch server 440 can provide supporting service to the pre-fetch clients and is discussed in detail below. The remote resource server 450 can store or manage the remote resources the pre-fetch client 410/410' may request and download. The pre-fetch server 440 or the remote resource server 450 can also include a desktop computer, a mobile computer, a tablet computer, a cellular device, a smartphone, or any computing systems that are capable of performing computation. Although FIG. 4 shows the pre-fetch server 440 and the remote resource server 450 as a single server, the pre-fetch server 440 and/or the remote resource server 450 can also include more than one physical and/or logical servers. The network 430, like the communication network 302 illustrated in FIG. 3, can include the Internet, a cellular network, a telephone network, a computer network, a packet switching network, a line switching network, a local area network (LAN), a wide area network (WAN), a global area network, a corporate network, an intranet, a virtual network, or any number of private networks currently referred to as an Intranet, and/or any other network or combination of networks that can accommodate data communication. Such networks can be implemented with any number of hardware and software components, transmission media and network protocols. While FIG. 4 shows the network 430 as a single network, the network 430 can include multiple interconnected networks listed above.

Each pre-fetch client 410/410' can include a pre-fetch agent 420/420'. The pre-fetch agent 420/420' can be embedded inside the pre-fetch client 410/410' as a software module, a hardware component, or a combination of both (described more fully below). Additionally, the pre-fetch agent 420/420' can also be separate from but coupled to the pre-fetch client 410/410'. The pre-fetch client 410/410' can communicate with the pre-fetch server 440 directly or via its pre-fetch agent 420/420'. The user 405 can directly or indirectly access one or more pre-fetch clients 410 and 410' which can collectively record and utilize the historical requests made by the user 405. For example, when the user 405 uses the pre-fetch client 410, the pre-fetch agent 420 can pre-fetch remote resources based on historical requests made by the user 405 on the multiple pre-fetch clients (e.g., 410 and 410', etc.). An example of this is if a user has multiple mobile devices (e.g., an iPhone and an iPad). The pre-fetch client 410 can track usage on both devices to make predictions on which resources to pre-fetch.

Figure 5:
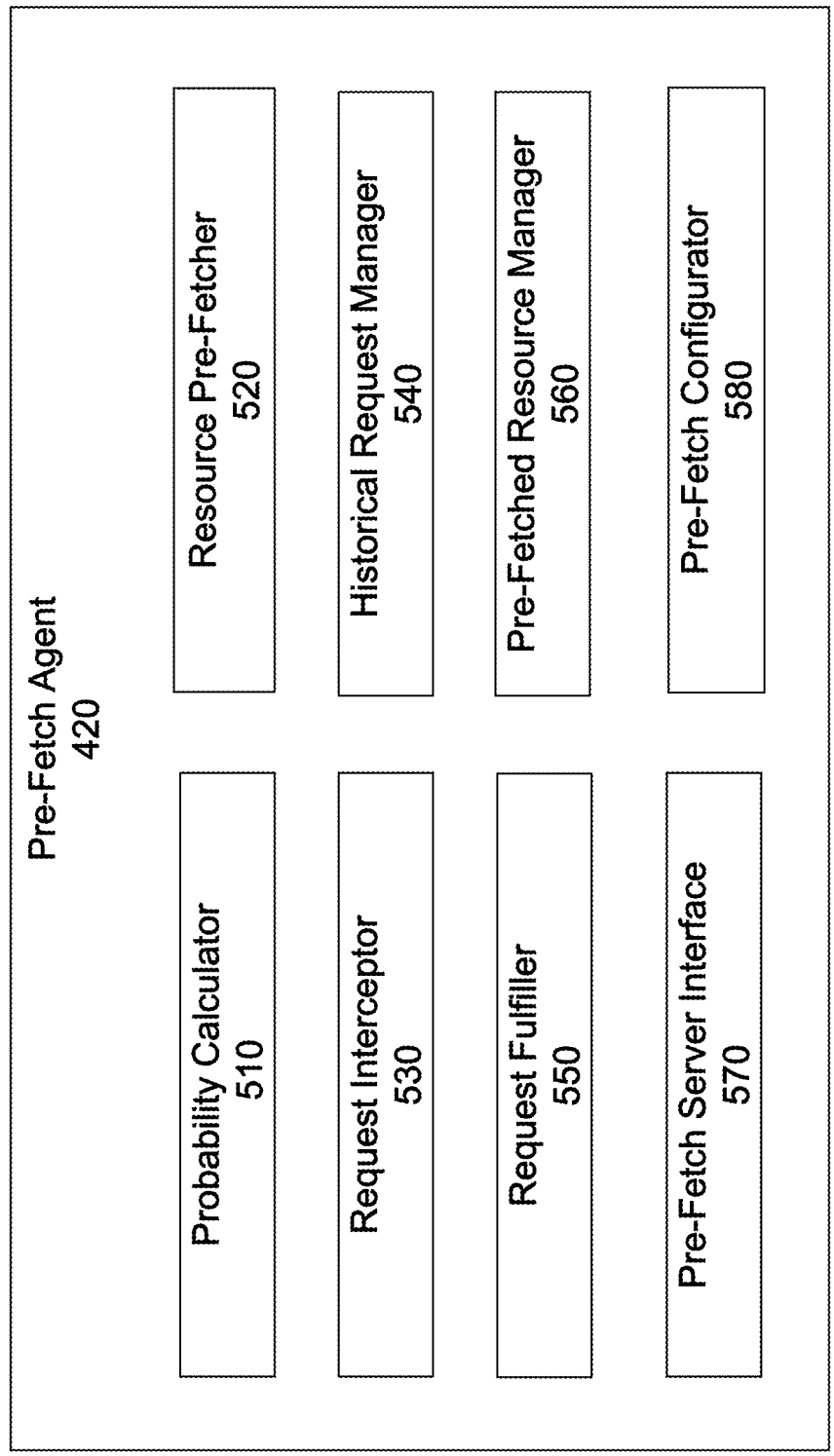
FIG. 5 illustrates a block diagram of an exemplary pre-fetch agent.

FIG. 5 illustrates a block diagram of an exemplary pre-fetch agent 420 according to certain embodiments of the disclosed subject matter. The pre-fetch agent 420 can include a probability calculator 510, a resource pre-fetcher 520, a request interceptor 530, a historical request manager 540, a request fulfiller 550, a pre-fetched resource manager 580, a pre-fetch server interface 570, and a pre-fetch configurator 580. The pre-fetch agent 420 can include additional modules, fewer modules, or any other suitable combination of modules that perform any suitable operation or combination of operations.

The probability calculator 510 can calculate a probability that a user will request a certain remote resource within, for example, a validity period. A validity period can be defined as the time duration that a remote resource is considered valid on a local device after it is fetched from a remote source. A remote resource's validity period can depend on many factors, such as the nature of the remote resource, how frequently it is expected to change, how important it is to reflect the latest change, the predictability of the remote resource based on historical information, and the cost of pre-fetching the remote resource over various network conditions, etc. In one example, a desktop wallpaper for a user account can be pre-fetched from a remote server (e.g., an AppSense User Virtualization server) and its validity period can be set to up to a few hours based on the assumption that downloading the wallpaper can take a long time and an out-of-date wallpaper does not severely impact the user experience. In another example, the validity period of a user's contact list can be set longer than that of the user's e-mail messages since the contact list is expected to be updated less frequently than the e-mail messages. In yet another example, the validity period of an application's settings (e.g., Windows registry) or data files can be set to a long value if the settings or data files are only expected to change once per application session or expected not to change at all after installation.

A validity period of a remote request (R) can be denoted as Validity(R). Validity(R) can be zero by default, which can mean that the corresponding remote resource is never pre-fetched and any remote requests, no matter how frequent they are, will result in a synchronous network operation (e.g., fetching the remote resource from a remote source). Preferably, remote resources that are frequently requested and have relatively large latency can be pre-fetched up to a period of Validity(R) (>0) before the remote resource is used. In one example, if Validity(DesktopWallpaper)=1 hour, the pre-fetched agent client 410 can respond to a request for "Desktop Wallpaper" to a remote source with a pre-fetched cache version if it has been pre-fetched within the last 1 hour. In another example, Validity(WordDictionaryLanguage)=1 day; Validity(NewEmail)=1 minute, etc.

Figure 6:
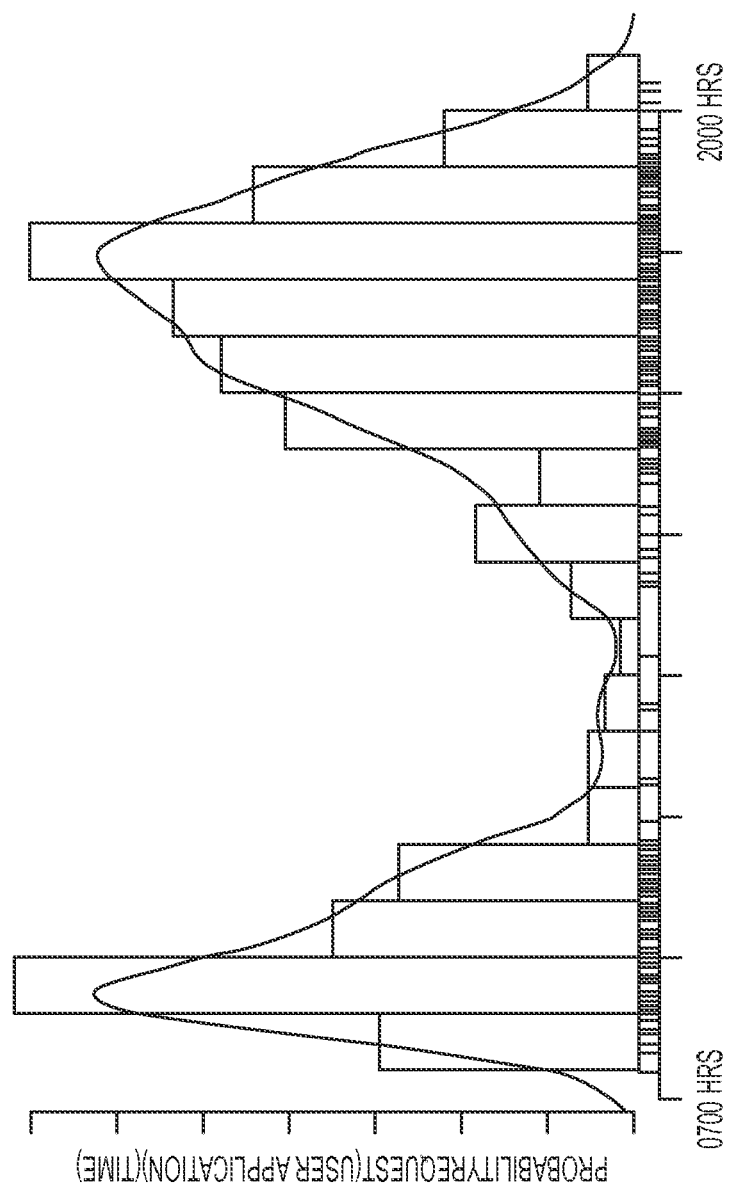
FIG. 6 illustrates an example of calculating a probability of requesting a remote resource.

The probability that a user will request a certain remote resource within a validity period can be calculated based on historical requests for the remote resource by the user. For example, the system can determine the probability P that a request R with parameters (p1, p2, p3 . . . ) will be made within the validity period of R. This can be expressed in equation form as:

$$P = \text{Probability}((\text{Time}(R(p1,p2,p3 \ldots)) - \text{Time}(\text{Now})) < \text{Validity}(R))$$

where:
R is the remote request;
p1, p2, p3 . . . are the parameters of the remote request (R), such as UserID, ApplicationID, Registry or File path, Department, Group, Day of the Week or any other custom parameter necessary to identify a certain remote request for the remote resource in a certain context;
Time(R(p1, p2, p3 . . . )) is the time a Request R with parameters p1, p2, p3 . . . will occur;
Time(Now) is the current time; and
Validity(R) is the validity period of R.
The parameters (p1, p2, p3 . . . ) can be used to build a predictive model. The probability that a user will request a certain remote resource $R_{(user, application, \ldots)}$ during the time interval from $t_0$ to $t_1$ can be calculated as:

$$P_{t_0 \text{ to } t_1} = \int_{t_0}^{t_1} \text{Probability}_{\text{Request}(user, application)}(t)\, dt$$

where:
$t_0 = \text{Time}(\text{Now})$; and
$t_1 = t_0 + \text{Validity}(\text{Request})$
In some embodiments, the historical requests by any user, for any request, and/or for any parameters can be represented in a more compact form. Thus, the probability can be calculated based on a representation of the historical requests, instead of the historical requests themselves. For example, a representation can include a summary of a historical usage pattern, such as a histogram, a probability density function, or the characteristic function of a probability density function. FIG. 6 illustrates an example of how a historical pattern can be represented. The representation of the historical requests can be maintained for all users, for all requests, and/or for all parameters. The representation can also be transferred to any pre-fetch clients that might need it to calculate probabilities for a particular user. FIG. 6 illustrates an example of calculating the probability of a certain request between 7 a.m. and 8 p.m. The calculated probability can provide a confidence level of the prediction.

Still referring to FIG. 5, the resource pre-fetcher 520 can pre-fetch the remote resource if, for example, the calculated probability is greater than a threshold. A threshold can be a pre-fetch aggressiveness, which can indicate how aggressively the pre-fetch agent 420 should pre-fetch remote resources. On one hand, an overly aggressive pre-fetch policy (e.g., pre-fetching everything) can put so much load on the remote resource server/network that synchronous requests to fetch remote resources when actually needed can become slow while most of the pre-fetched remote resources are discarded because their respective validity periods expire. On the other hand, an overly passive pre-fetch policy can result in too few remote resources being pre-fetched resulting in a situation where most applications would still need to make synchronous requests for remote resources while the network and server resources remain idle for most of the time.

Pre-fetch aggressiveness can be denoted as Ag, wherein 0≤Ag≤1. Ag=0.0 can mean that a remote resource is pre-fetched only when historical data suggests 100% certainty that a request for this remote resource will be made within its validity period. Ag=1.0 can mean that a remote resource is pre-fetched whenever the local cache expires, regardless whether a user is likely to explicitly or implicitly make a request for the remote resource. The pre-fetch aggressiveness can be defined at different levels, such as for each remote resource, for certain groups of remote resources, for all remote resources for a certain user, for certain remote resources for a certain group of users, for all remote resources for all users, for each user, for certain groups of users, or for all users, etc. The pre-fetch aggressiveness can also be defined for certain conditions, such as when connected via a slow network connection. The pre-fetch aggressiveness can be configured by a system administrator and/or customized by individual users. Typically, 0<Ag<1, Ag can be set based on various factors, such as the server and/or network configurations, the users, and remote resources, etc.

Still referring to FIG. 5, the request interceptor 530 can intercept a request for a remote resource. The request can be made by a user 405 or by a pre-fetch client 410, directly or indirectly, explicitly or implicitly. In one example, a user can explicitly request for a remote resource (e.g., a webpage such as www.weather.com) directly. In another example, a user can launch an application which can make the request (e.g., for application settings, personalization settings, etc.), either on startup or when certain feature is activated, with or without the user's knowledge. In another example, a user can log in to her network account; at that time the operation system can make the request to a remote server (e.g., to retrieve the user profile, desktop settings, and wallpapers, etc.). Once a request for a remote resource is intercepted, the pre-fetch agent 420 can try to fulfill the request and thus avoid the potentially costly and time-consuming downloading over the network.

The historical request manager 540 can record the request for the remote resource. The request can be added to the historical requests by the user 405. By accumulating historical data and applying machine learning techniques (e.g., Bayesian networks, Artificial neural networks, support vector machines, Boosting algorithms, etc.), prediction accuracy can be improved over time and increased usage within an organization. For example, a user's first logon may not be as predictable as the user's $200^{th}$ logon, if 90% of the user's previous logon events occurred between 8:30 am and 9:00 am. In another example, if a user opens Microsoft Outlook within 2 minutes of logon 90% of the time, it becomes easier to predict when Microsoft Outlook might need network based remote resources. Additionally or alternatively, the request can be added to a representation of the historical requests by the user 405. Optionally, certain or all components of a similar historical request manager can reside on a pre-fetch server 440.

The request fulfiller 550 can fulfill the request for the remote resource by the user. When the remote resource is already pre-fetched and cached on the local device (e.g., pre-fetch client 410, etc.), the request fulfiller 550 can use the pre-fetched remote resource to fulfill the request. As a result, the requesting application (and the user) typically does not need to wait for the potentially costly and time-consuming downloading operation over the network.

The pre-fetched resource manager 560 can manage the pre-fetched remote resources on the local device (e.g., pre-fetch client 410, etc.). In some embodiments, the pre-fetched resource manager 560 can check for the pre-fetched resources periodically or on demand (e.g., when a request is intercepted). If a pre-fetched resource has expired (e.g., its validity period has lapsed), the pre-fetched resource manager 560 can render the pre-fetched resource obsolete (e.g., by deleting the pre-fetched resource or by marking it obsolete, etc.). Rendering a pre-fetched resource obsolete can indicate to the pre-fetch agent 420 that it should no longer be used to fulfill a request for this remote resource. The pre-fetch agent 420 can pre-fetch a new copy of the remote resource from its remote source if, e.g., the remote resource is determined expired and needs to be pre-fetched again. Optionally, certain or all components of a similar pre-fetched resource manager can reside on a pre-fetch server 440.

The pre-fetch server interface 570 can provide the communication between the pre-fetch agent 420 and the pre-fetch server 440. In some embodiments, the pre-fetch server interface 570 can download/upload the historical requests of the user from/to the pre-fetch server 440. The download/upload can occur automatically, periodically, or on demand. As discussed earlier, the historical requests of the user can be collected from multiple devices (e.g., pre-fetch clients 410 and 410') accessed by the user. The pre-fetch server interface 570 can allow the prediction of a use's request on one device (e.g., 410) to utilize the user's requests gathered across multiple devices (e.g., 410 and 410'). For example, if a user 405 who has been using one device (e.g., pre-fetch client 410) for an extended period of time has just started using another device (e.g., pre-fetch client 410'), the user's historical requests recorded on the first device (e.g., pre-fetch client 410) can be uploaded to the pre-fetch server 440 then downloaded to the second device (e.g., pre-fetch client 410'). In this way, the pre-fetch agent (e.g., 420') on the second device (e.g., pre-fetch client 410') can calculate probabilities utilizing the user's the historical requests on other devices, even if this might be the first time the user uses the second device (e.g., pre-fetch client 410'). In some other embodiments, the pre-fetch server interface 570 can download the historical requests of other users from the pre-fetch server 440. The download can occur automatically, periodically, or on demand. The pre-fetch server interface 570 can allow the prediction of a use's request on one device (e.g., 410) to utilize the historical requests gathered from other users. For example, if a new user 405 joins an organization and has just started using a device (e.g., pre-fetch client 410), the historical requests collected for existing users of the organization can be downloaded to the device (e.g., pre-fetch client 410). In this way, the pre-fetch agent (e.g., 420) on the device (e.g., pre-fetch client 410) can predict the new user's request utilizing the other users' the historical requests, even if this might be the first time the new user 405 uses any of the device (e.g., pre-fetch clients 410 and 410'). Additionally or alternatively, a representation of the historical requests (e.g., a summary of the historical request) can be downloaded/uploaded from/to the pre-fetch server 440 through the pre-fetch server interface 570.

The pre-fetch configurator 580 can configure the pre-fetch agent 420. In some embodiments, the pre-fetch configurator 580 can set a validity period for a remote resource. A validity period can be set uniquely for each remote resource, commonly for a group of remote resources, or universally for all remote resources. Validity periods can be set per user 405, per pre-fetch client 410/410', or across all pre-fetch clients. The validity period can be set by a system administrator and/or can be customized by and/or for each user 405. In some other embodiments, the pre-fetch configurator 580 can set a pre-fetch aggressiveness (Ag) as discussed earlier. Optionally, certain or all components of a similar pre-fetch configurator can reside on a pre-fetch server 440.

Figure 7:
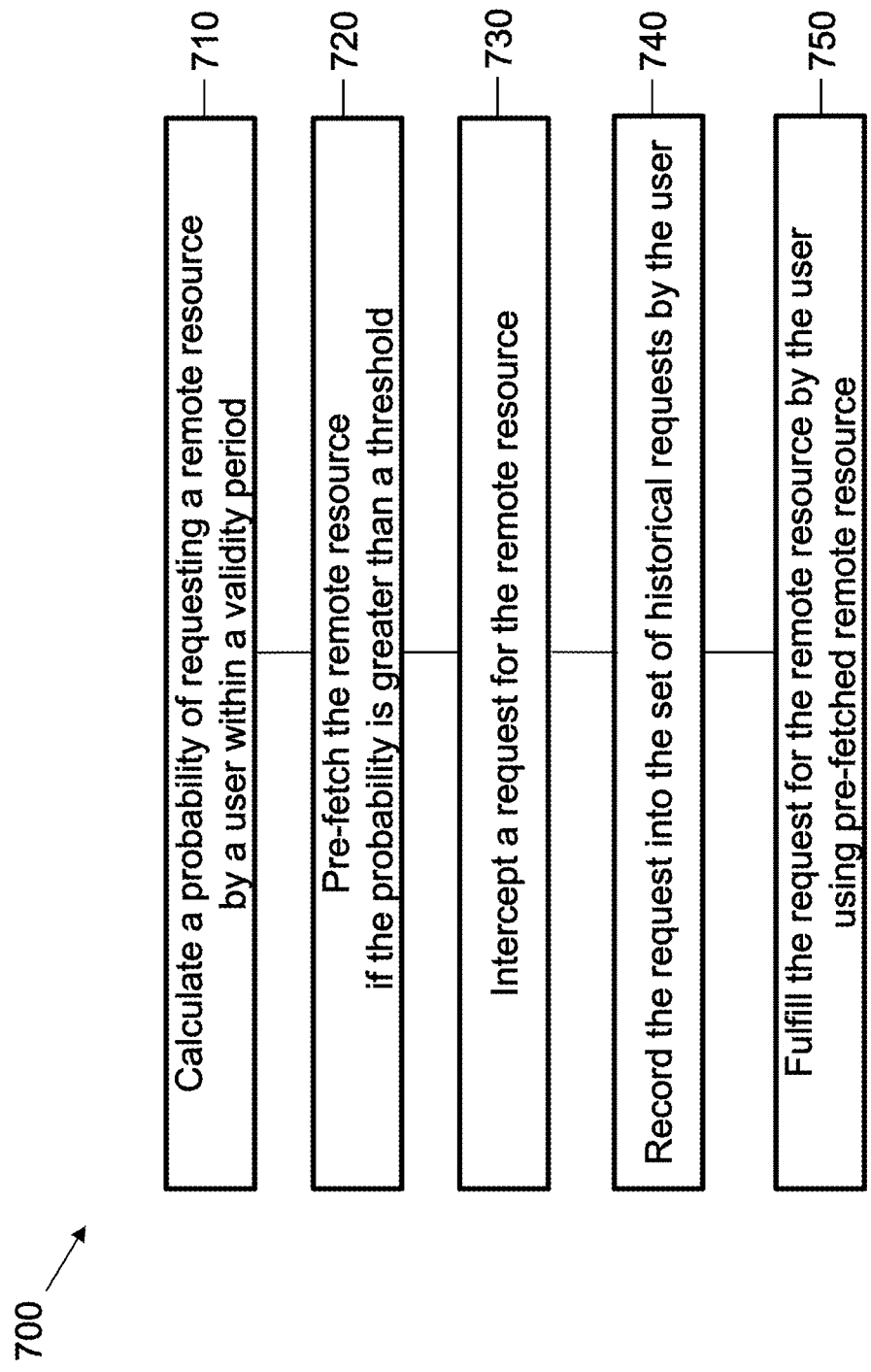
FIG. 7 includes an exemplary process of pre-fetching remote resources.

FIG. 7 illustrates an exemplary process 700 of pre-fetching remote resources according to certain embodiments of the disclosed subject matter. The process 700 can be modified by, for example, having stages rearranged, changed, added and/or removed.

At stage 710, a probability that a user 405 can request a remote resource within a validity period is calculated. In some embodiments, a probability calculator 510 can calculate the probability based on the historical requests for the remote resource by the user, on the same device or across multiple devices. In some other embodiments, a probability calculator 510 can calculate the probability based on the historical requests for the remote resource by the user and/or other users. Additionally or alternatively, the probability calculator 510 can calculate the probability based on a representation of the historical requests.

At stage 720, the remote resource can be pre-fetched from its remote source if the calculated probability is greater than a threshold. As discussed earlier, a threshold can be a pre-fetch aggressiveness.

At stage 730, a request for the remote resource (e.g., by the user 405) can be intercepted. In some embodiments, a request interceptor 530 can intercept the request by the user 405 on the device (e.g., pre-fetch client 410). As discussed earlier, the request can be made by the user 405 or by a pre-fetch client 410, directly or indirectly, explicitly or implicitly.

At stage 740, the request for the remote resource can be recorded. In some embodiments, a historical request manager 540 can record the request and add it into the historical requests (and/or a representation thereof) by the user 405. As discussed earlier, prediction accuracy can be improved over time and increased usage.

At stage 750, the request for the remote resource can be fulfilled. In some embodiments, a request fulfiller 550 can fulfill the request by the user 405 using the pre-fetched remote source cached on the local device (e.g., pre-fetch client 410, etc.). As a result, the requesting application (and the user) does not need to wait for the potentially costly and time-consuming downloading operation over the network. In some embodiments, the request fulfiller 550 can fulfill the request by the user 405 via a synchronous request for remote resource depending upon policy.

Optionally, the process 700 can include other stages. In one example, the process 700 can include a stage where the pre-fetched remote resource is periodically checked and rendered obsolete if it has expired. In another example, the process 700 can include a stage where the historical requests (and/or a representation thereof) are uploaded/downloaded to/from a remote server (e.g., pre-fetch server 440). In yet another example, the process 700 can include a stage where certain pre-fetch settings are configured (e.g., validity periods, threshold/pre-fetch aggressiveness values, etc.).

According to embodiments of the disclosed subject matter, data that is likely to remain constant over a medium to long term basis can preferably be predictively pre-fetched for consumption by an application. Some examples of such data include:
- User/Machine specific registry settings to be used by an application may need to be downloaded from a central server resource when providing a virtual machine or application environment.
- User specific files that may need to be downloaded from a server such as desktop wallpapers, application data files, application configuration files. In one example, AppSense Environment Manager (EM) can download registry, data and configuration files for an application when it starts up.)

In contrast, real time application data such as streams or live data are preferably not pre-fetched.

In one exemplary scenario, applications can include a binary component which can be common to all installations on a particular operating system/hardware architecture, and a configuration component that can define how that application behaves in a particular context. For example, Microsoft Word can behave differently in different locales according to the language selected for spell checking. The configuration component can be stored on a central resource linked to a particular user (e.g., via AppSense User Virtualization, which can virtualize data and resources based on the user instead of the machines). For this scenario, the configuration component can be pre-fetched to the local devices where the user logs in.

Figure 8:
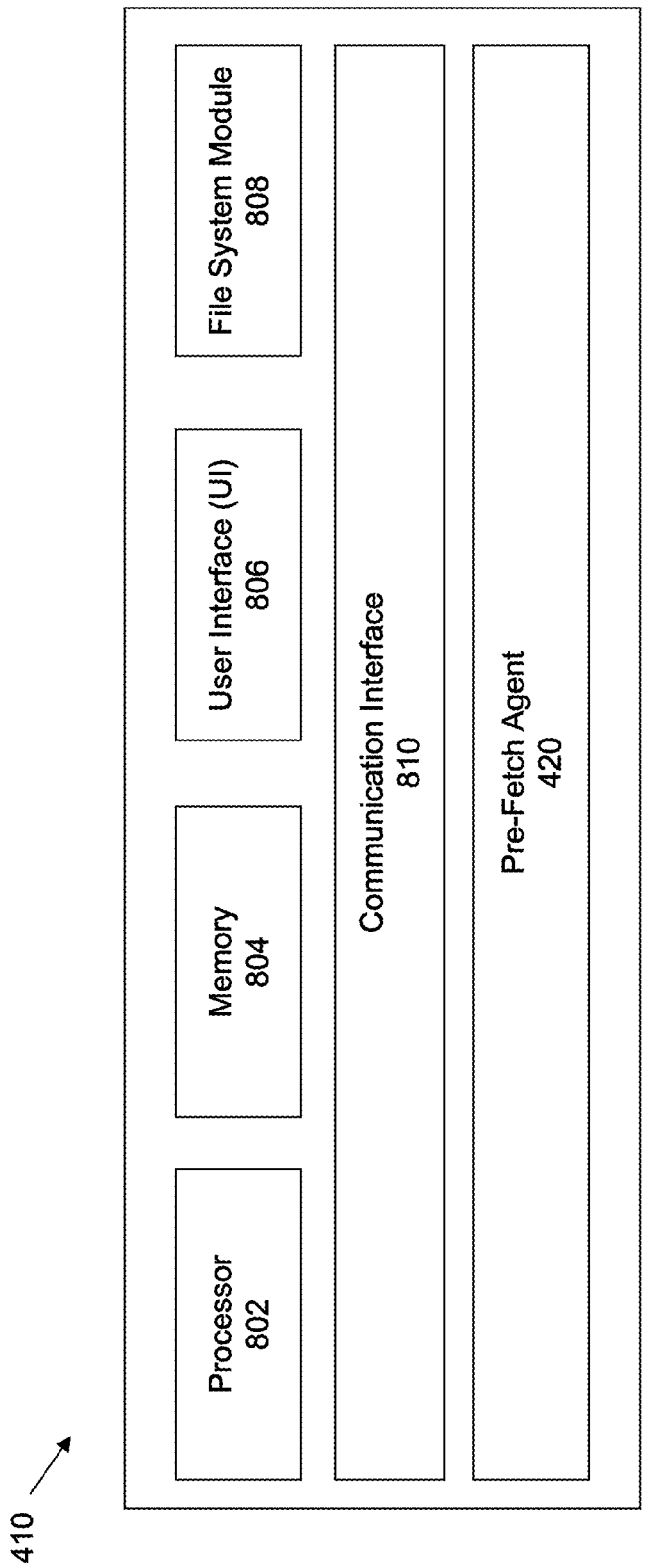
FIG. 8 illustrates a block diagram of an exemplary pre-fetch client.

FIG. 8 illustrates a block diagram of an exemplary pre-fetch client 410 according to certain embodiments of the disclosed subject matter. The pre-fetch client 410 can include at least one processor 802 and at least one memory 804. The processor 802 can be hardware that is configured to execute computer readable instructions such as software. The processor 802 can be a general processor or be an application specific hardware (e.g., an application specific integrated circuit (ASIC), programmable logic array (PLA), field programmable gate array (FPGA), or any other integrated circuit). The processor 802 can execute computer instructions or computer code to perform desired tasks. The memory 804 can be a transitory or non-transitory computer readable medium, such as flash memory, a magnetic disk drive, an optical drive, a programmable read-only memory (PROM), a read-only memory (ROM), a random access memory (RAM), or any other memory or combination of memories.

The pre-fetch client 410 can also optionally include a user interface (UI) 806, a file system module 808, and a communication interface 810. The UI 806 can provide an interface for users to interact with the pre-fetch client 410 in order to access the remote resource pre-fetching arrangement 400. The file system module 808 can be configured to maintain a list of all data files, including both local data files and remote data files, in every folder in a file system. The file system module 808 can be further configured to coordinate with the memory 804 to store and cache files/data. The communication interface 810 can allow the pre-fetch client 410 to communicate with external resources (e.g., a network or a remote client/server). The pre-fetch client 410 can also include a pre-fetch agent 420. The description of the pre-fetch agent 420 and its functionalities can be found in the discussion of FIGS. 1-7. The pre-fetch client 410 can include additional modules, fewer modules, or any other suitable combination of modules that perform any suitable operation or combination of operations.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

A "server," "client," "agent," "module," "interface," and "host" is not software per se and includes at least some tangible, non-transitory hardware that is configured to execute computer readable instructions. In addition, the phrase "based on" does not imply exclusiveness—for example, if X is based on A, X can also be based on B, C, and/or D, . . . .

What is claimed is:

1. A computerized method of pre-fetching remote resources, comprising:
    calculating a probability of a request for a remote resource by a user within a validity period, based on a representation of historical requests for the remote resource by the user;
    pre-fetching the remote resource if the probability is greater than a threshold;

intercepting an actual request for the remote resource by the user;

recording the actual request into the representation of the historical requests by the user; and fulfilling the actual request for the remote resource using the pre-fetched remote resource.

2. The computerized method of claim 1, further comprising rendering the pre-fetched remote resource obsolete if the pre-fetched remote resource expires based on the validity period.

3. The computerized method of claim 1, further comprising receiving the representation of the historical requests by the user from a remote server, wherein the historical requests for the remote resource originate from multiple devices used by the user.

4. The computerized method of claim 1, further comprising transmitting the representation of the historical requests by the user to the remote server.

5. The computerized method of claim 1, further comprising:

receiving a second representation of additional historical requests for the remote resource by other users from a remote server; and calculating the probability of the request for the remote resource by the user within the validity period, based on the second representation of the additional historical requests for the remote resource by the other users.

6. The computerized method of claim 1, further comprising setting the validity period.

7. The computerized method of claim 1, further comprising setting the threshold.

8. A computer system for pre-fetching remote resources, comprising:

a probability calculator configured to calculate a probability of a request for a remote resource by a user within a validity period, based on a representation of historical requests for the remote resource by the user;

a resource pre-fetcher configured to pre-fetch the remote resource if the probability is greater than a threshold;

a request interceptor configured to intercept an actual request for the remote resource by the user;

a historical request manager configured to record the actual request into the representation of the historical requests by the user; and a request fulfiller configured to fulfill the request for the remote resource using the pre-fetched remote resource.

9. The computer system of claim 8, further comprising a pre-fetched resource manager configured to render the pre-fetched remote resource obsolete if the pre-fetched remote resource expires based on the validity period.

10. The computer system of claim 8, further comprising a pre-fetch server interface configured to download the representation of the historical requests by the user from a remote server, the historical requests for the remote resource originating from multiple devices used by the user.

11. The computer system of claim 10, wherein the pre-fetch server interface is further configured to transmit the representation of the historical requests by the user to the remote server.

12. The computerized method of claim 10, wherein:

the pre-fetch server interface is further configured to receive a second representation of additional historical requests for the remote resource by other users from a remote server; and the probability calculator is further configured to calculate the probability of the request for the remote resource by the user within the validity period based on the second representation of the additional historical requests for the remote resource by the other users.

13. The computer system of claim 8, further comprising a pre-fetch configurator configured to set the validity period.

14. The computer system of claim 8, further comprising a pre-fetch configurator configured to set the threshold.

15. A non-transitory computer readable medium having executable instructions operable to, when executed by a processor, cause the processor to:

calculate a probability of a request for a remote resource by a user within a validity period, based on a representation of historical requests for the remote resource by the user;

pre-fetch the remote resource if the probability is greater than a threshold;

intercept an actual request for the remote resource by the user;

record the actual request into the representation of the historical requests by the user; and fulfill the actual request for the remote resource using pre-fetched remote resource.

16. The non-transitory computer readable medium of claim 15, wherein the executable instructions are further operable to, when executed by the processor, cause the processor to render the pre-fetched remote resource obsolete if the pre-fetched remote resource expires based on the validity period.

17. The non-transitory computer readable medium of claim 15, wherein the executable instructions are further operable to, when executed by the processor, cause the processor to receive the representation of the historical requests by the user from a remote server, wherein the historical requests for the remote resource originate from multiple devices used by the user.

18. The non-transitory computer readable medium of claim 15, wherein the executable instructions are further operable to, when executed by the processor, cause the processor to transmit the representation of the historical requests by the user to the remote server.

19. The non-transitory computer readable medium of claim 15, wherein the executable instructions are further operable to, when executed by the processor, cause the processor to:

receive a second representation of additional historical requests for the remote resource by other users from a remote server; and calculate the probability of the request for the remote resource by the user within the validity period, based on the second representation of the additional historical requests for the remote resource by the other users.

20. The non-transitory computer readable medium of claim 15, wherein the executable instructions are further operable to, when executed by the processor, cause the processor to set the validity period.

21. The non-transitory computer readable medium of claim 15, wherein the executable instructions are further operable to, when executed by the processor, cause the processor to set the threshold.

* * * * *